UNITED STATES PATENT OFFICE.

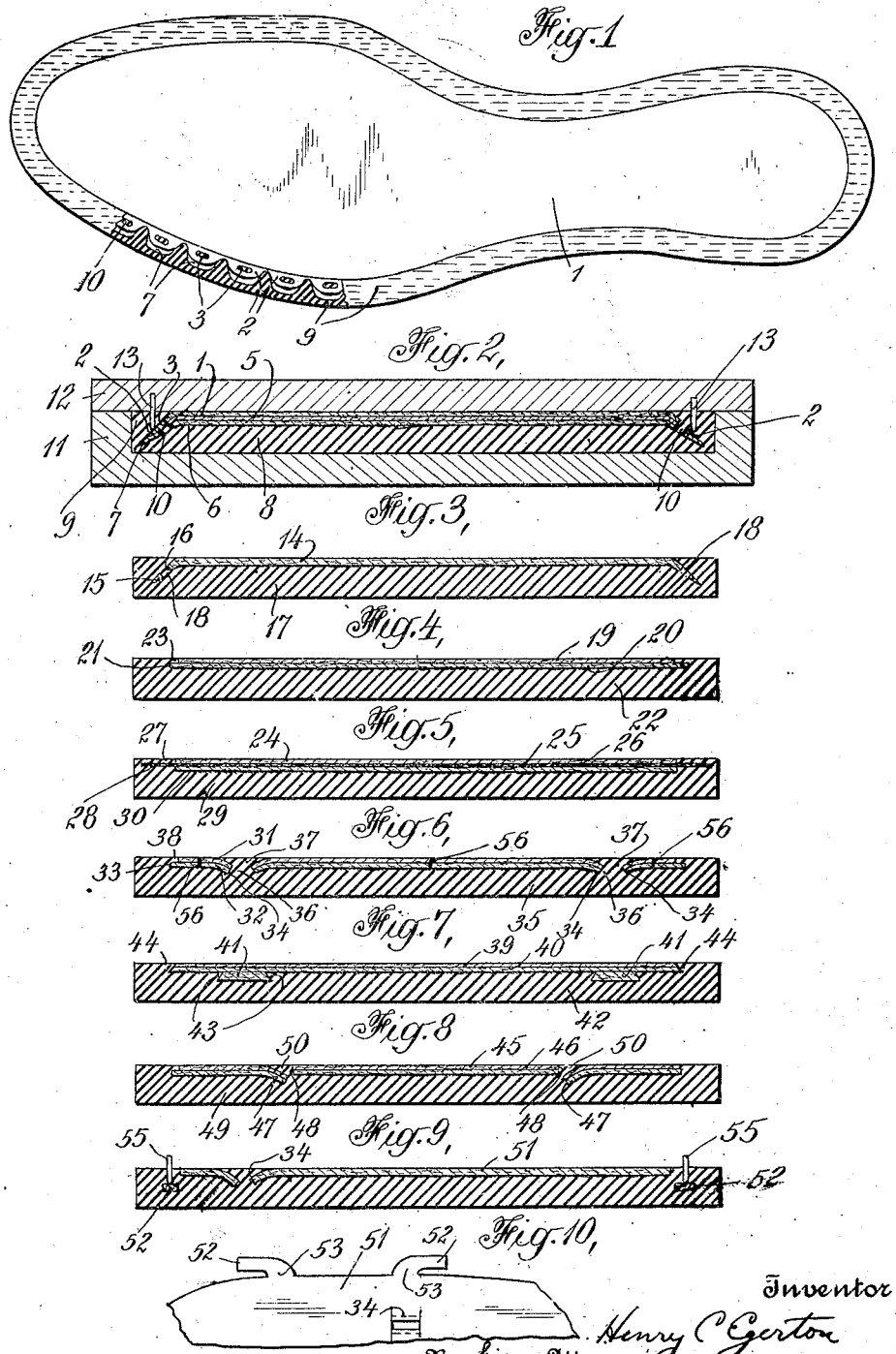
H. C. EGERTON.
RUBBER SHOE SOLE WITH INTERLOCKING STIFFENER MEMBER.
APPLICATION FILED JUNE 12, 1918.
1,282,398. Patented Oct. 22, 1918.

HENRY C. EGERTON, OF RIDGEWOOD, NEW JERSEY.

RUBBER SHOE-SOLE WITH INTERLOCKING STIFFENER MEMBER.

1,282,398.  Specification of Letters Patent.  Patented Oct. 22, 1918.

Application filed June 12, 1918. Serial No. 239,514.

*To all whom it may concern:*

Be it known that I, HENRY C. EGERTON, a citizen of the United States, now a resident of Ridgewood, county of Bergen, and State of New Jersey, have made a certain new and useful Invention Relating to Rubber Shoe-Soles with Interlocking Stiffener Members, of which the following is a specification, taken in connection with the accompanying drawing which forms part of the same.

The invention in this application, which is a continuation in part of my co-pending applications, Serial No. 218,679, filed February 23, 1918, and Serial No. 235,078, filed May 17, 1918, that is, contains subject-matter taken therefrom, relates particularly to stiffened rubber shoe soles sometimes including the heel portions thereof and comprising strips or members interlocked therewith and formed of cloth, paper or other fabric, preferably of a rather fibrous open texture which has been more or less impregnated or coated with cured or solidified phenol aldehyde cementing material. One or more layers of canvas or other fabric strips or members may carry or be impregnated or coated with such phenolic condensation cementing material as bakelite varnish or the like, which is cured or solidified by heat so as to cement the layers together and form a sole stiffening member adapted to give valuable stiffening action when secured to or incorporated with a rubber shoe sole. Such a stiffener member makes it possible to use for the wearing surface of the shoe sole the softer and stronger grades of vulcanized rubber compositions giving increased wearing and other desirable properties as compared to the stiffer rubber compositions usually employed which contain such undesirably large proportions of inert material, the incorporated or united stiffener preventing undesirable bending or penetration of the shoe sole when engaging hard objects or uneven ground. Such stiffening elements which may be made and sold for subsequent incorporation or union with rubber soles may with advantage be formed with interlocking securing members or portions, such as edge or other depressions, irregularities or undercut portions with which the rubber sole composition of any suitable character may more or less interlock or unite prior to being vulcanized, and if desired, the stiffener members may be formed with securing holes, apertures or flanges to secure still more positive and strong interlocking engagement with the rubber sole. Of course, in many cases the stiffener may be cured in the same mold and at the same time that the rubber shoe sole composition is vulcanized and in this and other cases it is in some instances desirable to form a frictioned or other rubber coating applied to one face or other suitable portions of the fabric forming the stiffener member so as to secure more thorough union with the rubber shoe sole during the vulcanizing thereof.

In the accompanying drawing showing in a somewhat diagrammatic way various illustrative embodiments of this invention, Figure 1 is a top view of a shoe sole, part of which is broken away to more clearly show the construction.

Fig. 2 is an enlarged transverse section thereof in connection with the mold in which it may be formed.

Fig. 3 is a transverse section through another construction.

Figs. 4 to 9 are transverse sections showing other shoe sole constructions; and

Fig. 10 is a partial top view showing the stiffener member of Fig. 9.

In the illustrative form of construction shown in Figs. 1 and 2, the sole stiffener element or member 1 may be formed of one or more layers of cloth, paper or other fabric, and if desired several layers of loosely woven canvas may be used for this purpose and sufficiently coated or impregnated with phenolic condensation cementing material, such as bakelite varnish No. 1 so as to thoroughly unite them when cured at sufficient heat to solidify the phenolic condensation cementing material in the well known manner. If desired, the edge portion 2 of this fabric stiffener member may be somewhat thinner as indicated in Fig. 2 as by omitting one or more layers of the fabric at this edge portion which may advantageously be turned downward so as to form a securing member, flange or portion to have interlocking engagement with the rubber shoe sole 8. In some cases it is desirable to use in connection with such a stiffener member an additional sheet or layer of fabric forming a connector member, such as 5, which may advantageously have a coating or layer of frictioned or other rubber coating composition 6 applied to its lower face, while the upper face thereof may be coated with phenolic condensation cementing material to a sufficient extent to permanently cement or attach this layer to the stiffener member 1 under the curing heat employed. The edge portion 7 of this connector member which is preferably relatively free from such phenolic condensation cementing material may serve as a sewing reinforcing strip through which may extend the sewing or other attaching means connecting the sole to the other parts of the shoe and this portion extending out beyond the edge 2 of the stiffener member may of course be coated with rubber on both sides of the same and may extend adjacent the periphery of the shoe sole throughout a greater or less extent thereof. Such a stiffener member may of course have the phenolic condensation cementing material therein cured or solidified before the rubber shoe sole composition is incorporated therewith and for this purpose the curing may advantageously take place in a suitable metallic mold at such moderate heat of about 200 degrees more or less for a number of hours as does not undesirably harden or vulcanize any rubber coating that may have been originally applied to any of the fabric members. The heat treatment of several hours at approximately 200° Fahrenheit gives a sufficient curing of this phenolic condensation cementing material so as to permanently unite the various elements and stiffen and strengthen the member so that it may be subsequently united to a rubber shoe sole during the vulcanizing thereof. If desired, however, the stiffener may be cured at the same time that it is vulcanized to or interlocked with the vulcanized rubber shoe sole 8, and Fig. 2 shows a mold which may be used in this connection, a sheet or layer of rubber sole composition 8 being placed in the bottom of the mold and the stiffener elements 1, 5, placed therein and then a fillet or strip of rubber 9 may be applied around the edge of the mold so as to retain the edge portions of the stiffener in desired depending position during the curing or vulcanizing process. If desired also suitable pins 13 may be arranged in the upper mold section or cover 12 so that when this is forced down on the lower section 11 of the mold these pins positively force down the edge portions of the stiffener at various points so that their desired position is more definitely insured in the finished article. A more thorough and strong union between the parts may be insured by forming suitable securing holes or apertures 3 in the edge portions of the stiffener member and connector member through which the interlocking securing plugs or members 10 of rubber composition may extend so that when the rubber sole is vulcanized and the phenolic condensation cementing material simultaneously cured by a heat of 300° Fahrenheit or so for half an hour more or less, all the parts are thoroughly united and the stiffener member is definitely interlocked with the rubber shoe sole so as to form an integral shoe sole element that may be attached to the upper in any desired way. It is advantageous to have the stiffener member containing cured phenolic condensation cementing material form the upper surface of the shoe sole as it is used, since this material forms a permanently impervious or waterproof layer which prevents any possible injurious or undesirable action on the wearer's foot of the sulfur or other elements in the rubber shoe sole. Fig. 1 shows the extent to which the stiffener member 1 may be exposed on the upper surface of the shoe sole and also indicates the scalloped arrangement of the edge of the stiffener member which may be used, if desired, the depending separated or scalloped portions 2 of the stiffener member and the connector member 7 beneath allowing the rubber to extend around these portions and more thoroughly unite the edge portion 9 of the shoe sole with the remainder thereof. This arrangement also prevents any undesirable local stiffness in the edges of the stiffener member and is sometimes advantageous.

Fig. 3 shows another arrangement in which the stiffener member 14 formed of one or more connected layers of fabric carrying cured phenolic condensation cementing material may advantageously be provided with depending securing flanges or portions 15, to be interlocked with the corresponding portions of the rubber shoe sole 17. This interlocking securing action may also be promoted by forming securing holes or apertures 16 in this depending flange of the stiffener which may be relatively thinner adjacent the edge thereof. Stiffener members of this character may of course be formed of a single thickness of very heavy canvas or other fabric and may be cured or solidified by a heat treatment sufficient to partially or moderately cure the incorporated phenolic condensation cementing material and then at any subsequent time if that is found desirable the stiffener members may be incorporated with a rubber shoe sole, such as 17, which may be vulcanized around the stiffener so as to securely and thoroughly interlock therewith and prevent any danger of subsequent disengagement of the parts during transportation and application of the sole to a shoe.

Fig. 4 shows still another arrangement in which the stiffener member is indicated as comprising two layers 19, 20, of canvas or other suitable material which may be coated or impregnated with phenolic condensation cementing material and then cured into stiff, permanent form in which the two layers are strongly and permanently united. The edges of this stiffener may advantageously be formed with any suitable form of securing edge portions, such, for instance, as irregularities or depressions or undercut portions with which the rubber shoe sole may unite or interlock. Fig. 4 shows a desirable form in which the lower or inner layer of fabric forming the stiffener has projecting edge portions 21 extending more or less around the same and projecting beyond the upper layer 19 so that when the rubber shoe sole composition 22 of any desired character is molded and vulcanized around the stiffener, interlocking securing portions of rubber 23 are formed which effectively prevent disengagement during shipment and positively hold the parts in proper position after the shoe sole has been sewed or otherwise applied. The use of one or more such fabric stiffener strips or elements containing cured phenolic condensation material permanently incorporated and united with a rubber sole is quite advantageous in many cases, since the rubber may be given in this way sufficient additional strength or stiffness so that when the wearer is walking over a stony or other uneven surface the shoe sole is not objectionably bent or indented, and if desired such stiffened rubber soles may be thus given fully as much strength and stiffness as if formed entirely of high grade sole leather without sacrificing the desirable tough and other serviceable characteristics of a relatively pure rubber composition which are usually desirable in the wearing surface of the sole. Any desired number of coated or impregnated fabric strips or members may be used for such stiffening, strengthening purposes and heavy fabric of any suitable character, such, for instance, as canvas may be used and may advantageously be thoroughly impregnated so that when compressed and cured it may contain some thirty to sixty per cent. more or less of bakelite varnish or other suitable phenolic condensation cementing material. Good results in making such sole stiffening members in this way may be secured by thoroughly impregnating or filling heavy canvas with No. 1 bakelite varnish as by repeatedly immersing the canvas therein and running it through pressure rolls. Two plies of heavy cotton duck are usually sufficient for general purposes when something equivalent to eight ounce army duck is used for these two layers. They may be thoroughly and strongly united by first impregnating them with phenolic condensation cementing material of this character and then curing or uniting them by heat after they have been forced directly together so as to preferably give what is known as the intermediate curing or hardening of such phenolic cementing material, as is shown as bakelite varnish. Good results can usually be secured by curing such material under pressure at temperatures of about 300° or so Fahrenheit for an hour or so, and when two such layers of duck are cured in this way they can be thoroughly united into a quite smooth, hard, strong sheet about $\frac{1}{16}$ of an inch thick which contains some fifty per cent. by weight of the cured phenolic condensation cementing material. The resistance of such a compound sheet stiffening element a sixteenth of an inch thick can be appreciated by considering that a relatively narrow strip can be bent from a straight form into a circle of two or three inches diameter without serious cracking or injury, and also that the bending modulus of rupture thereof corresponds to 15,000 to 18,000 pounds or so per square inch. Cured phenolic condensation stiffening elements with or without one or more layers of cloth, paper or other fibrous material are permanently stiff and strong and are practically waterproof and impervious and also independent of any ordinary heat changes to which footwear is properly subjected which is in marked contrast to the softening of pyroxylin or similar cementing material when moderately heated and its tendency to crack when chilled. A stiffening element of this general character consisting of or comprising a sheet or layer of cured phenolic condensation cementing material when used in a shoe sole above a rubber sole or element therein and preferably incorporated with such rubber sole element can effectively prevent the undesirable action of the rubber composition on the foot of the wearer so as to remove this objection to ordinary rubber shoe soles.

In the embodiment of the invention shown in Fig. 5 one or more fabric strips or stiffener members 24, 25 coated or impregnated with phenolic condensation cementing material may be used and if desired an interposed or uniting strip or member 26 of special open mesh or loosely woven fabric, if desired, may be used in contact with or interposed between such stiffening strips. In some cases it is sufficient where such an open mesh strip is interposed between two previously impregnated stiffening elements to rely upon the phenolic condensation cementing material which may be squeezed into this connector strip during the molding and curing process without applying any such cementing material directly thereto. This uniting stiffener strip may, if desired, have an edge portion 28 extending into or through the adjacent attaching or edge portion 27 of the rubber shoe sole 29 and this part of the strip may have the rubber securely incorporated with or attached thereto during the vulcanizing process in connection with a previously applied layer or coating of any suitable rubber composition which this part of the connector strip may contain. If desired, a frictioned or other rubber coating 30 may be applied to the lower surface of the stiffening strip or element 25 with which the rubber sole engages and this is preferably done before the phenolic condensation cementing material is applied to this strip or layer of fabric. Fig. 6 shows still another arrangement in which several layers of canvas or other fabric 31, 32 impregnated or coated with phenolic condensation cementing material may be united to form the stiffener and having undercut edge portions formed by the projecting portions 33 of the lower layer 32 of such material. Other interlocking portions of the stiffener may be conveniently formed by cutting or bending down flaps or portions 34 which may be first cut along the H shaped lines indicated in Fig. 10 and then forced downward during the molding and curing of the stiffener, for example, so as to be permanently retained in this general shape. During the molding and vulcanizing of the rubber sole 35 thereto portions or plugs of rubber 37 may be placed in these openings or forced thereinto during the molding and vulcanizing process so as to form interlocking securing plugs or rivet members 36 of rubber definitely positioning this part of the stiffener with respect to the coöperating part of the shoe sole without leaving any very large or undesirable amount of rubber exposed on the upper surface of the sole element. Of course any of the preceding forms of stiffener comprising one or more layers of canvas or other fabric carrying phenolic condensation cementing material may be sold or shipped in uncured form, the layers being preferably adhesively secured in proper position or slightly tacked or stitched together as by the stitching 56 shown in Fig. 6, or they may be assembled in uncured condition in the vulcanizing mold together with the rubber sole composition, and then during the heat of the vulcanizing process and pressure of the mold the parts may all be forced together and the rubber vulcanized and interlocked and united with the stiffener elements which are permanently stiffened and united by the curing of the incorporated bakelite or other phenolic condensation cementing material. In this way it is possible to coat or impregnate such fabric stiffening sheets or elements and supply them in uncured condition, if desired, to rubber shoe sole manufacturers for incorporation in any desired part of the rubber soles in which their edge portions at least are preferably more or less embedded and interlocked.

Fig. 7 shows another arrangement in which the stiffener member may comprise one or more layers of fabric such as 39, 40, carrying or impregnated with phenolic condensation cementing material and to which may be united or secured dovetailed or other interlocking securing members 41 of phenolic condensation cementing material in which any desired fibrous material has been incorporated, such as cotton or wood fiber to the extent of 30 to 50 per cent, or so. This entire stiffener member may be molded and cured and then united with a rubber shoe sole 42 during the vulcanizing thereof which forces the rubber elements 43 around the dovetailed securing members 41 of the stiffener and also may secure more or less interlocking action with the edge portion 44 of the stiffener. Fig. 8 shows still another arrangement in which interlocking tongues or flanges such as 47, may be formed in the stiffener member comprising several layers of canvas or other fabric 45, 46 containing phenolic condensation stiffening material which may be cured in a mold which simultaneously forces these interlocking tongues 47 into the depending position indicated. The subsequent molding and vulcanizing of the rubber sole 49 forces the securing plugs or members 50 up through the apertures left by forcing down these interlocking tongues so as to form somewhat similar interlocking securing plugs or members of rubber to effectively unite the sole elements and hold them in desired alinement while the shoe is worn. Fig. 9 shows another form of stiffener member which may be formed of a single layer 51 of thick heavy fabric carrying cured phenolic condensation cementing material, generally similar interlocking tongues or flanges 52 being formed in one or more edges of the peripheral portions of the stiffener which may be otherwise imperforate so as to form an impervious and waterproof upper surface for the major part of the shoe sole. As shown in Fig. 10 these interlocking tongues may project from the edge of the stiffener 51 and have necks or junction portions 53 of ample extent to prevent their breaking under service conditions while at the same time these tongues may be bent downward during the curing or vulcanizing operation so as to secure ample interlocking engagement between the stiffener and shoe sole. If desired also additional interlocking action may be secured by forming a suitable number of interlocking tongues 34 in the inner portion of the stiffener, the two coöperating tongues being bent downward as indicated in Fig. 9 so that the rubber composition can come up through them to form connecting plugs or rivet portions as previously described. The shaping and curing of the stiffener member may of course take place at the same time that the rubber sole is vulcanized, and for this purpose suitable small diameter alining pins 55 are preferably used in the vulcanizing mold so as to preferably force some at least of these interlocking tongues down into the desired position in which they will securely engage and be interlocked with the rubber composition 54. As the shoe sole is worn any such interlocking members or even the more or less roughened or irregular lateral edges of the stiffener may engage the adjacent rubber composition sufficiently to prevent undesirable lateral movement of the parts so that the relatively hard stiffener member is not likely to work into engagement with the attaching stitches and injure or sever the same.

This invention has been described in connection with a number of illustrative embodiments, forms, proportions, elements, parts, shapes, materials, compositions, methods of preparation, production and use, to the details of which disclosure the invention is not of course to be limited, since what is claimed as new and what is desired to be secured by Letters Patent is set forth in the appended claims.

1. The stiffened rubber shoe sole comprising a stiffener member composed of fabric carrying cured phenolic condensation cementing material and forming a substantially impervious surface and having a depending relatively thin flexible edge portion adapted to receive the attaching stitching and a vulcanized rubber shoe sole having edge portions interlocked with and inclosing said edge portions of said stiffener to permamently unite the parts.

2. The stiffened rubber shoe sole comprising a stiffener member formed of a plurality of layers of fabric containing cured phenolic condensation cementing material and having securing edge portions including undercut portions and a vulcanized rubber shoe sole permanently united to and interlocked with said stiffener and inclosing and concealing its edge.

3. The stiffened rubber shoe sole comprising a stiffener member formed of fabric containing cured phenolic condensation cementing material and having securing edge portions and a rubber shoe sole permanently united to and interlocked with said stiffener.

4. The stiffened rubber shoe sole comprising a stiffener member formed of woven fabric containing cured phenolic condensation cementing material and having irregular securing edge portions including undercut portions and a vulcanized rubber shoe sole permanently united to and interlocked with said stiffener.

5. The stiffened rubber shoe sole comprising a stiffener member formed of woven fabric containing cured phenolic condensation-cementing material and having irregular securing edge portions and a vulcanized rubber shoe sole engaging and united to said edge portions of said stiffener and maintaining its lateral alinement.

6. The stiffened rubber shoe sole comprising a stiffener member containing cured phenolic condensation cementing material and having securing edge portions and a rubber shoe sole engaging said edge portions of said stiffener and maintaining its lateral alinement.

7. The stiffened rubber shoe sole element comprising a wearing surface of rubber composition and an incorporated stiffener member formed of fabric containing cured phenolic condensation cementing material forming the central portion of the opposite surface and having securing edge portions including undercut portions and permanently united to and interlocked with the rubber composition forming the exposed edge of said sole element and adapted to hold said stiffener away from the attaching stitching therein.

8. The stiffened rubber shoe sole element comprising a wearing surface of rubber composition and a connected stiffener member containing cured phenolic condensation cementing material forming a portion of the opposite surface and having securing edge portions united to and interlocked with the rubber composition forming the exposed edge of said sole element and adapted to hold said stiffener out of undesirable contact with the attaching stitching therein.

9. The stiffened rubber shoe sole comprising an incorporated stiffener member formed of fabric containing cured phenolic condensation cementing material forming substantially one entire surface of said shoe sole and having perforated securing portions permanently united to and interlocked with the rubber sole composition.

10. The stiffened rubber shoe sole comprising an incorporated stiffener member formed of fibrous material containing cured phenolic condensation cementing material and having securing portions permanently united to and interlocked with the rubber sole composition.

11. A stiffener member adapted to be incorporated with a vulcanized rubber shoe sole comprising a plurality of layers of canvas carrying cured phenolic condensation cementing material uniting and strengthening said stiffener member and edge portions of said stiffener being provided with apertures which when said edge portions are bent downward to form securing portions are adapted to promote interlocking union of said stiffener during the vulcanization of the connected shoe sole.

12. A stiffener member adapted to be incorporated with a vulcanized rubber shoe sole comprising canvas carrying cured phenolic condensation cementing material to strengthen said stiffener member and portions of said stiffener being provided with apertures which are adapted to form securing portions and to promote interlocking union of said stiffener during the vulcanization of the connected shoe sole.

13. A stiffener member adapted to be incorporated with a vulcanized rubber shoe sole comprising fibrous material carrying phenolic condensation cementing material to strengthen said stiffener member, and portions of said stiffener being provided with apertures which are adapted to form securing portions and to promote interlocking union of said stiffener during the vulcanization of the connected shoe sole.

14. The stiffener member adapted to be incorporated with a rubber shoe sole and comprising a plurality of layers of fabric carrying phenolic condensation cementing material for uniting and strengthening said stiffener member, edge portions of said stiffener being shaped to be bent downward and form depending securing portions adapted to promote the interlocking union of said stiffener member with the connected shoe sole.

15. The stiffener member adapted to be incorporated with a rubber shoe sole and comprising fabric carrying phenolic condensation cementing material for strengthening said stiffener member, edge portions of said stiffener being shaped to be bent downward and form depending securing portions adapted to promote the interlocking union of said stiffener member with the connected shoe sole.

16. The stiffener member adapted to be incorporated with a rubber shoe sole and comprising fabric carrying phenolic condensation cementing material for strengthening said stiffener member, portions of said stiffener being shaped to form securing portions adapted to promote the interlocking union of said stiffener member with the connected shoe sole.

17. The integral stiffener for rubber shoe soles, comprising a stiffener member composed of fabric carrying cured phenolic condensation cementing material and having a relatively thin edge portion, a connector member having one surface united to said stiffener member by such phenolic condensation cementing material and having a rubber coating on its other surface, there being securing holes formed in the edge portions of the said stiffener member adapted to promote the interlocking union of said stiffener member with a vulcanized rubber shoe sole.

18. The integral stiffener for rubber shoe soles, comprising a stiffener member composed of fabric carrying cured phenolic condensation cementing material and having a rubber coating on its other surface, there being securing holes formed in the edge portions of the said stiffener member adapted to promote the interlocking union of said stiffener member with a vulcanized rubber shoe sole.

19. The fibrous stiffener member adapted to be incorporated with a vulcanized rubber shoe sole and comprising fabric carrying cured phenolic condensation cementing material strengthening said stiffener member, edge portions of said stiffener forming irregular undercut securing portions adapted to promote the interlocking union of said stiffener member with the connected shoe sole.

20. The stiffener member adapted to be incorporated with a rubber shoe sole and comprising fabric carrying cured phenolic condensation cementing material strengthening said stiffener member, edge portions of said stiffener forming irregular securing portions adapted to promote the union of said stiffener member with the connected shoe sole.

21. The stiffener member adapted to be incorporated with a rubber shoe sole and comprising fabric carrying cured phenolic condensation cementing material strengthening said stiffener member, portions of said stiffener being bent and perforated to form perforated securing portions adapted to promote the interlocking union of said stiffener member with the connected shoe sole.

22. The stiffener member adapted to be incorporated with a rubber shoe sole and comprising fabric carrying cured phenolic condensation cementing material strengthening said stiffener member, the central portions of said stiffener being substantially imperforate and portions of said stiffener forming securing portions adapted to promote the interlocking union of said stiffener member with the connected shoe sole.

23. The integral stiffener member adapted to be incorporated with a vulcanized rubber shoe sole and comprising a plurality of layers of fabric carrying cured phenolic condensation cementing material strengthening said stiffener member, the edge portions of said stiffener being formed with projecting peripheral securing tongues adapted to promote the interlocking union of said stiffener member during the vulcanizing of the connected shoe sole.

24. The integral stiffener member adapted to be incorporated with a vulcanized rubber shoe sole and comprising fabric carrying cured phenolic condensation cementing material strengthening said stiffener member, the edge portions of said stiffener being formed with securing tongues adapted to promote the interlocking union of said stiffener member during the vulcanizing of the connected shoe sole.

25. The shoe sole construction comprising a shaped stiffener member formed of a plurality of layers of fabric impregnated with cured phenolic condensation cementing material and a coöperating shoe sole element engaging the edge portions of said stiffener member and preventing undesirable movement thereof.

26. The shoe sole construction comprising a stiffener member formed of fabric containing cured phenolic condensation cementing material and a shoe element coöperating with the edges of said stiffener member and preventing undesirable lateral movement thereof.

27. The shoe construction comprising a stiffener member formed of fibrous material carrying cured phenolic condensation cementing material and a shoe element coöperating with said stiffener member and preventing undesirable movement thereof.

HENRY C. EGERTON.